US009454689B2

(12) United States Patent
McCloskey et al.

(10) Patent No.: US 9,454,689 B2
(45) Date of Patent: Sep. 27, 2016

(54) ROLLING SHUTTER BAR CODE IMAGING

(71) Applicant: Honeywell International Inc., Morris Plains, NJ (US)

(72) Inventors: Scott McCloskey, Minneapolis, MN (US); Sharath Venkatesha, Minnetonka, MN (US)

(73) Assignee: Honeywell International, Inc., Morris Plains, NJ (US)

(*) Notice: Subject to any disclaimer, the term of this patent is extended or adjusted under 35 U.S.C. 154(b) by 0 days.

(21) Appl. No.: 14/577,515

(22) Filed: Dec. 19, 2014

(65) Prior Publication Data
US 2016/0180137 A1 Jun. 23, 2016

(51) Int. Cl.
*G06K 7/10* (2006.01)
*G06K 7/14* (2006.01)

(52) U.S. Cl.
CPC .................. *G06K 7/1473* (2013.01)

(58) Field of Classification Search
USPC ............................ 235/454, 462.01
See application file for complete search history.

(56) References Cited

U.S. PATENT DOCUMENTS

2010/0044436 A1 2/2010 Powell et al.
2011/0163166 A1* 7/2011 Wang ............... G06K 7/10722
235/472.01

FOREIGN PATENT DOCUMENTS

WO 2011009005 A2 1/2011

OTHER PUBLICATIONS

European Search Report for related EP Application 15199942; Dated May 27,2016; 9 pages.
QImaging, "Rolling Shutter vs. Global Shutter"; Aug. 1, 2014; 9 pAGES, [retrieved from Internet: URL:http://web.archive.org/web/20140801141116/http://www.qimaging.com/ccdorscmos/pdfs/RollingvsGlobalShutTer.pdf on Mar. 30, 2016].

* cited by examiner

*Primary Examiner* — Jamara Franklin
(74) *Attorney, Agent, or Firm* — Additon, Higgins & Pendleton, P.A.

(57) ABSTRACT

Methods, devices, and systems for rolling shutter bar code imaging are described herein. One method includes initiating the imaging of a bar code by initiating a sequence of procedures to accumulate a charge in a first row of pixels as they are exposed to light thereby capturing data to create a first row of the image of the bar code at a first time, initiating the sequence of procedures to accumulate a charge in a subsequent row of pixels as they are exposed to light thereby capturing data to create a subsequent row of the image of the bar code at a second time, actuating a light source to illuminate the bar code at multiple specific times during a pre-determined timing sequence, and de-blurring the image data for each row based on the specific times during the pre-determined timing sequence that the light source was actuated.

20 Claims, 7 Drawing Sheets

ROLLING SHUTTER BAR CODE IMAGING

TECHNICAL FIELD

The present disclosure relates to methods, devices, and systems for rolling shutter bar code imaging.

BACKGROUND

For bar code scanners, motion tolerance refers to the amount of motion a target bar code can undergo during the image capture phase of a successful decode. For the widest range of applications, including positioning the scanner over a moving conveyor belt, users want the highest motion tolerance possible.

For two dimensional (2D) scanners that involve an area image sensor (e.g., a complementary metal oxide semiconductor (CMOS) or charge-coupled device (CCD) image sensor), rolling shutter devices are less expensive and smaller than global shutter imagers. Their use can also enable a lower shelf price and/or higher profit margins, in many applications.

However, artifacts associated with rolling shutter sensors limit the motion tolerance of the scanner. For example, one low-cost, rolling shutter scanner presently available has a motion tolerance of 10 cm/s whereas a global shutter scanner presently available has a tolerance of 600 cm/s. This lack of tolerance presents an issue with utilizing rolling shutter scanning technology in bar code applications.

DETAILED DESCRIPTION

The embodiments of the present disclosure relate to methods, devices, and systems for rolling shutter bar code imaging. In order to effectively utilize rolling shutter technology, the embodiments have to address the issues discussed above.

In doing so, there are two different artifacts which arise from the use of a rolling shutter sensor to capture moving objects. The first comes from the fact that each row of an image captured by a rolling shutter sensor has a different exposure window. As used herein, an exposure window is the period of time during which pixels in a row of an image accumulate incoming light).

Figure 1:
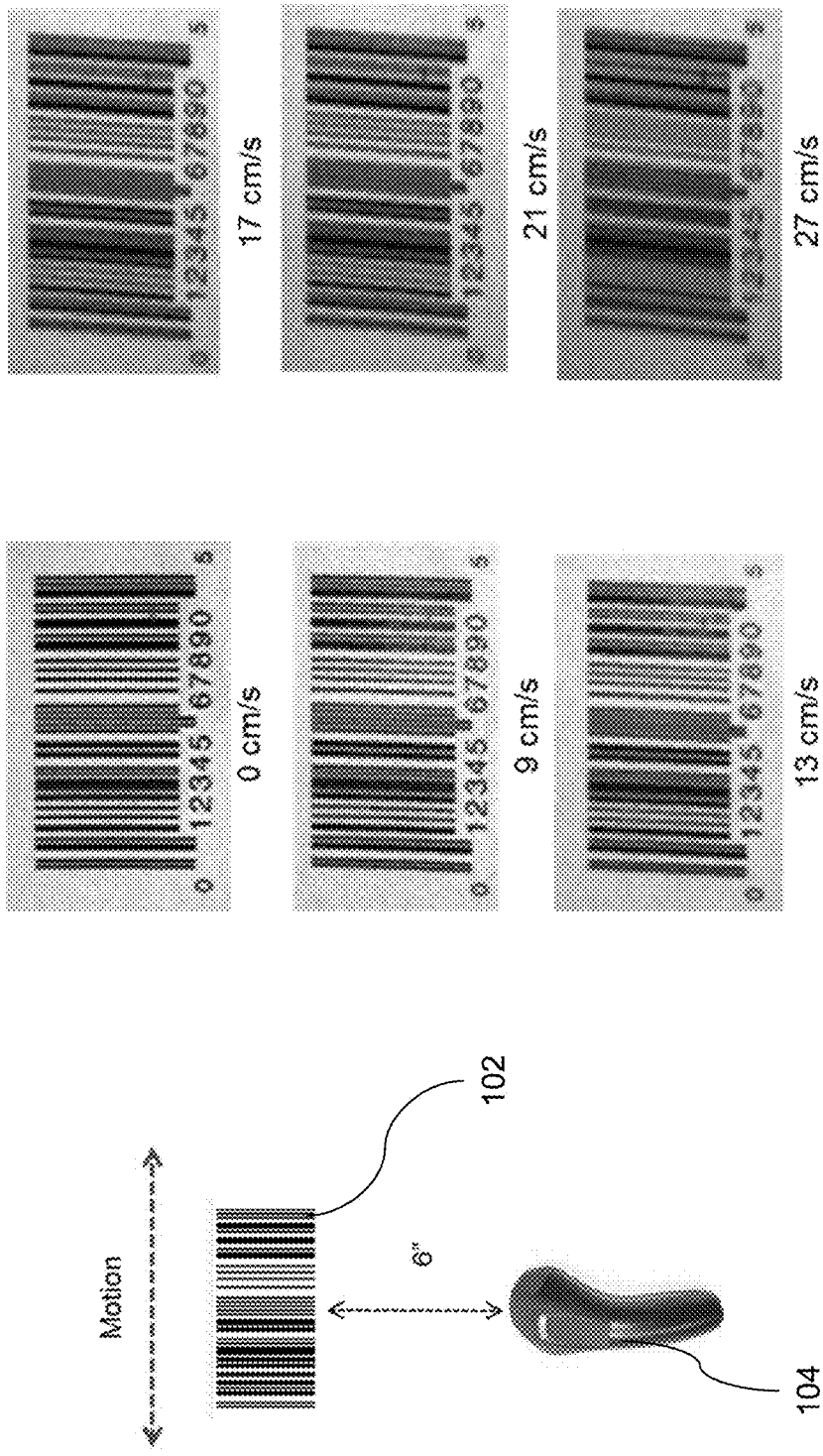
FIG. 1 provides an illustration of a bar code and its possible motion past a bar code reader and a number of bar code images taken as the bar code is moving at different speeds.

FIG. 1 provides an illustration of a bar code and its possible motion past a bar code reader and a number of bar code images taken as the bar code is moving at different speeds. As illustrated in FIG. 1, a bar code 102 can be scanned by a bar code reader 104 and the information can then be transferred to a computing device (either within the reader or located remotely from the reader) where it can be stored in memory or used to execute instructions. When the bar code moves linearly with respect to the bar code scanner during exposure (as indicated by the dashed line), the result is a skew of the bar code, where the vertical lines of the bar code are skewed by an angle proportional to the bar code's speed.

As can be seen in the images in the middle and right of FIG. 1, as the bar code's speed relative to the reader increases, the bar code becomes more angled. The bar code also becomes blurrier as the speed increases. This blurriness will be discussed in more detail below.

Hardware solutions to the skew artifact in the art include "rolling shutter with global reset," a rolling shutter architecture where each row starts exposure at the same time, but each ends at a different time. This results in uneven exposure, and spatially-varying effects which are problematic in their own right.

The state of the art solution to rolling shutter artifacts is the use of a global reset architecture. In a global reset architecture, the charges in all of the pixels on the sensor are cleared at the same time, so the exposure of all rows starts at the same time.

This is in contrast to a rolling shutter architecture, where rows start exposing in sequence, with a fixed delay between the start for adjacent rows. While this partially addresses the skew artifact, it leads to differing exposure of different image rows, and it does not address the blur problem, as discussed below.

Figure 2:
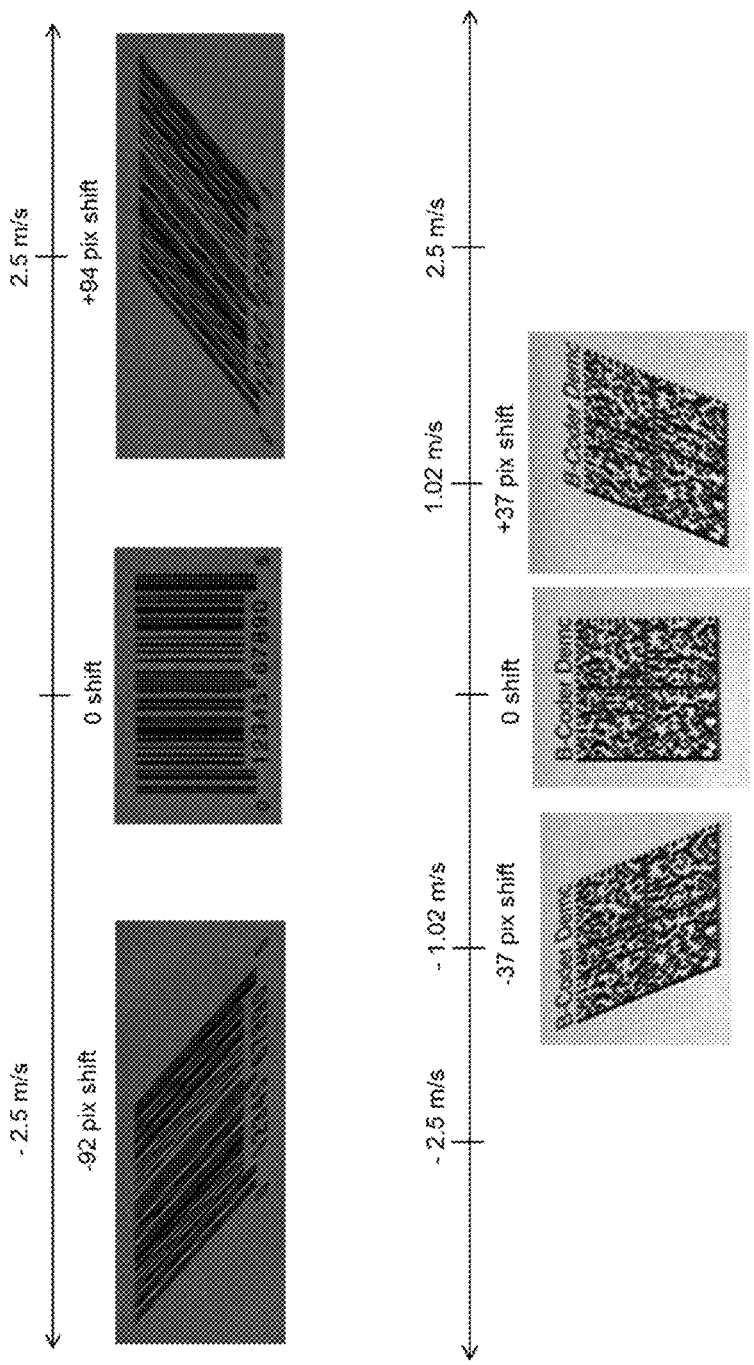
FIG. 2 illustrates distortion based on pixel shift of a one dimensional and a two dimensional bar code.

FIG. 2 illustrates distortion based on pixel shift of a one dimensional and a two dimensional bar code. As used herein, the slope of the skew can be determined based upon the angle at which one side of the bar code is skewed with respect to the top or bottom of the bar code. The examples provided on the left and right sides in FIG. 2 are not actual image capture results (the center images are actual image captures), but have been created to show that if some imager could obtain a non-blurred image that has a high level of pixel shift, then they could be read by a reader. However, actual images captured contain both skew and blur effects.

In the examples provided in FIG. 2, because the lines (shapes in the 2D bar code) are discrete, the reader will be able to read that bar code accurately. However, when the images begin to blur, the shape/lines are no longer discrete and can no longer be accurately read.

Motion blur is the second, and often more problematic artifact arising from rolling shutter. Motion blur results from the fact that there is no time during which every row of the image is being exposed, meaning that there's no time when a single, high-powered flash can be used to illuminate the field of view.

Instead, due to device and power constraints, the illumination is on at a low power for a longer duration. This results in motion blur because the lower illumination state is insufficient to use a very short exposure time.

Figure 3:
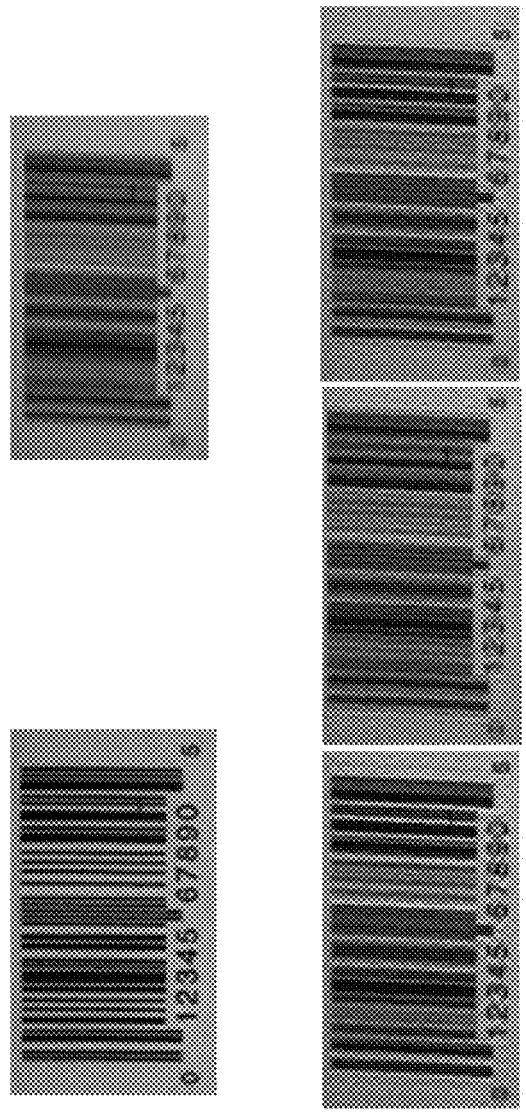
FIG. 3 illustrates an unblurred image, a blurred image, and three examples of de-blurred bar codes.

FIG. 3 illustrates an unblurred image, a blurred image, and three examples of de-blurred images of the same bar codes. In these examples, the top left image provides an example of a bar code that is clear enough to be read by the reader. In the process of capturing a barcode image, the image is captured as the illumination is consistent throughout the entire capture cycle.

In the image at the top right of FIG. 3, the image is created from raw data and shows both blurring and skewing. The images below have been created from image data that has been processed using three different currently available de-blurring algorithms.

These images could not be read by the barcode reader because even having been de-blurred, the lines of the barcode are not discrete enough to be readable. Through use of the techniques of the embodiments of the present disclosure, barcodes will be more readable than when just image processed with the above techniques.

Figure 4A:
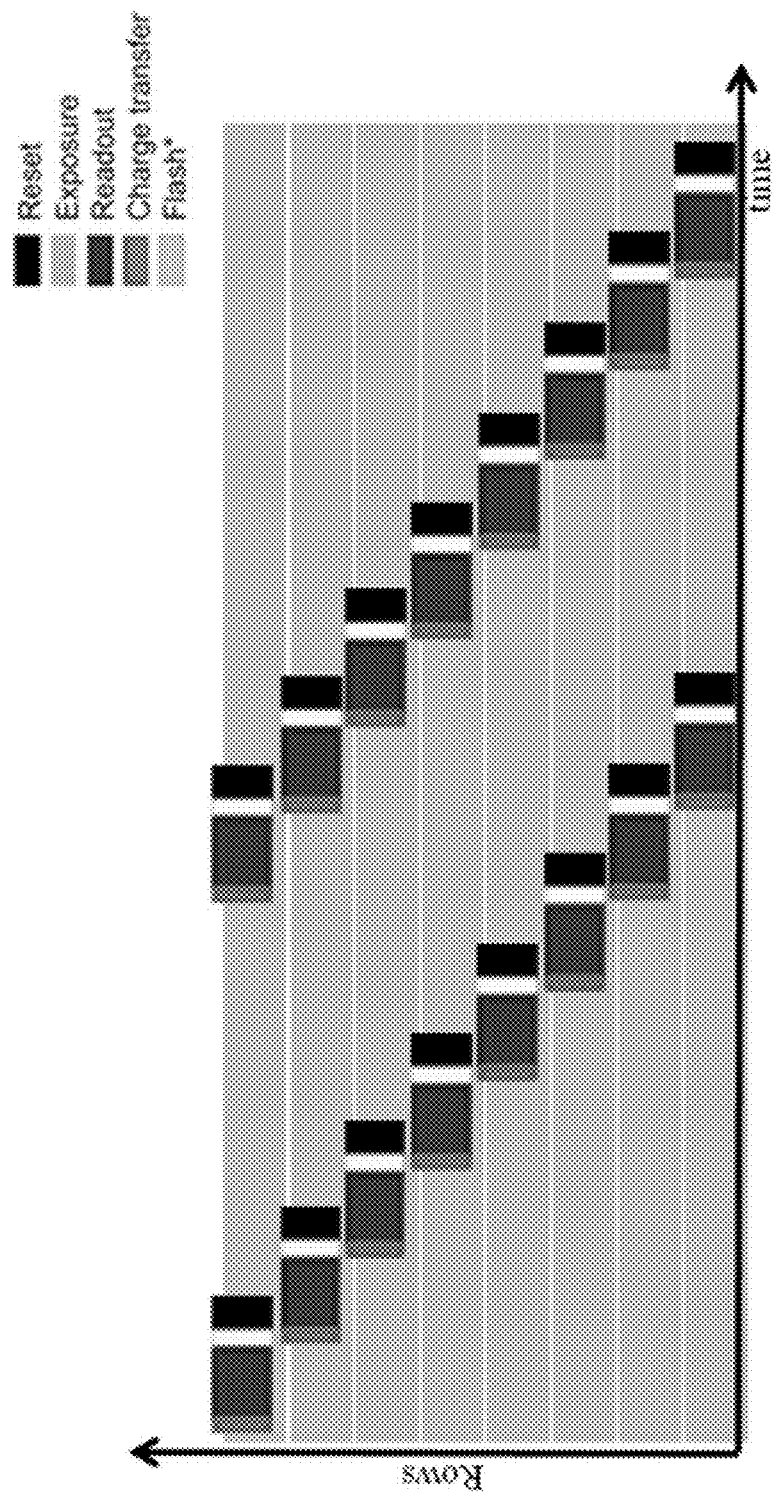
FIG. 4A provides an illustration of rolling shutter timing diagram.

FIG. 4A provides an illustration of rolling shutter timing diagram. In this example, a number of rows (e.g., in the illustration there are eight horizontally oriented rows of pixels) are shown in the illustration. On each row is shown the sequence of procedures through which the rows progress as the bar code reader is attempting to capture the image of the bar code.

Figure 4B:
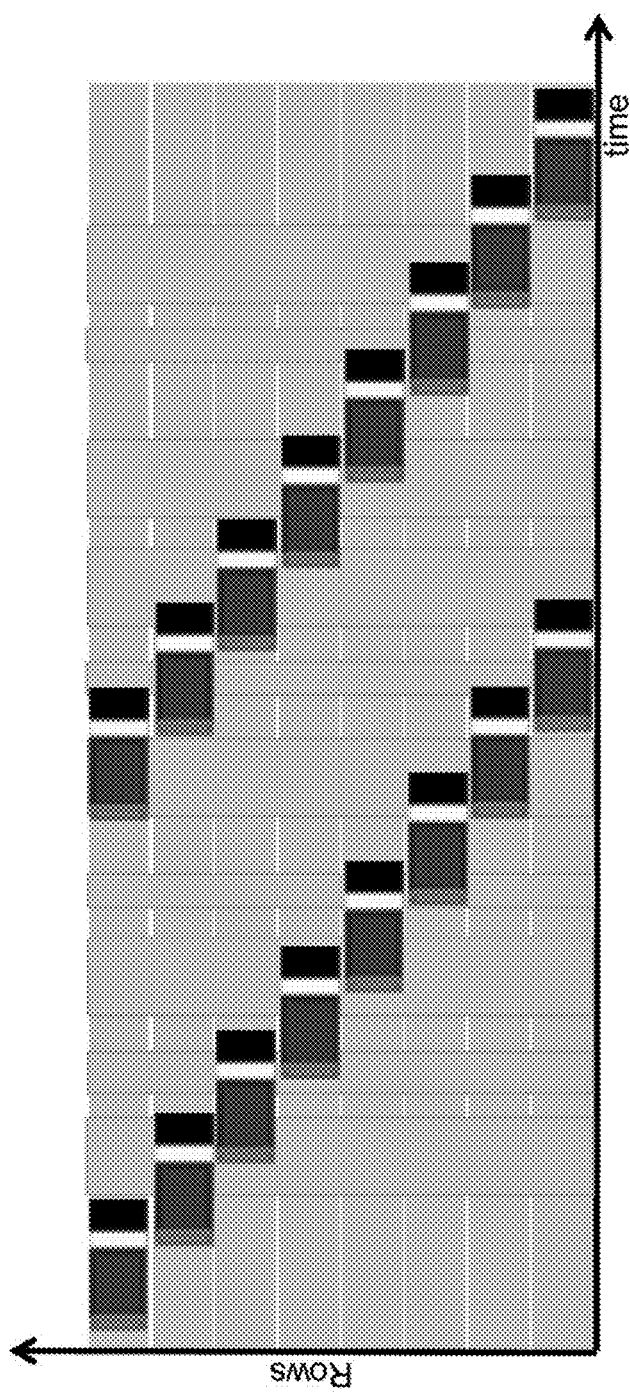
FIG. 4B illustrates a fluttering flash method in accordance with one or more embodiments of the present disclosure.

The sequence illustrated in FIGS. 4A and 4B includes a reset, an exposure, a readout, a charge transfer, and a flash *(the flash is only used in the embodiment illustrated in FIG. 4B). The sequence provided in FIG. 4A represents a process that may be utilized currently and the process shown in FIG. 4B would be accomplished using an embodiment of the present disclosure.

The reset process clears the charge from a row of pixels and marks the start of that row's exposure. During the exposure process charge accumulates in the pixels as they are exposed to light thereby capturing data to create an image. The charge transfer takes energy collected during the exposure and transfers it to an area of the sensor with readout circuitry. The readout process digitizes the charges and places it into memory for storage and/or processing by a processor of a computing device.

However, as can be seen from this illustration, there is no time at which every row is being exposed simultaneously. This can be the reason why the bar codes have differing characteristics as illustrated above in FIG. 3.

FIG. 4B illustrates a fluttering flash method in accordance with one or more embodiments of the present disclosure. In order to reduce or resolve such issues, the embodiments of the present disclosure utilize flashes of light at different times during the rolling shutter sequence of procedures.

In the example embodiment provided in FIG. 4B, a sequence of procedures is taking place to capture the image data needed to create an image and as the rolling shutter process is progressing, a series of flashes (increased intensity of light) are provided to the area that is to be imaged. The flashes can be in a pattern, for example, one short flash and then a long flash, in some embodiments. However, it is beneficial to have a short flash and/or a long flash occur during the sequence of procedures for each row in a particular cycle.

In this manner, those portions of the sequence occurring during a similar flash event (e.g., a long flash period) can be compared and such comparison can be helpful in de-blurring the image. When a long flash period and a short flash period are both present, the long events can be compared and the short event can be compared and then the results of the comparisons can be compared to aid in the de-blurring process.

Provided below are example embodiments of the present disclosure. In one method for rolling shutter bar code imaging, the method includes initiating the imaging of a bar code by initiating a sequence of procedures (such as those discussed above with respect to FIG. 4B) to accumulate a charge in a first row of pixels as they are exposed to light thereby capturing data to create a first row of the image of the bar code at a first time and initiating the sequence of procedures to accumulate a charge in a subsequent row of pixels as they are exposed to light thereby capturing data to create a subsequent row of the image of the bar code at a second time. As used herein the terms "first" and "subsequent" mean that one happens before another, but they do not have to be adjacent in time and another process may occur before the first and/or in between the first and subsequent, in some instances.

As discussed with respect to the illustration of FIG. 4B, the method also includes actuating a light source to illuminate the bar code at multiple specific times during a pre-determined timing sequence. The image data can then be de-blurred for each row based on the specific times during the pre-determined timing sequence that the light source was actuated. In some embodiments, the de-blurred image can be sent to a decoder where information within the barcode is read.

The method can also include de-skewing the de-blurred image as discussed herein. In some embodiments, the image data can be de-skewed.

Figure 6:
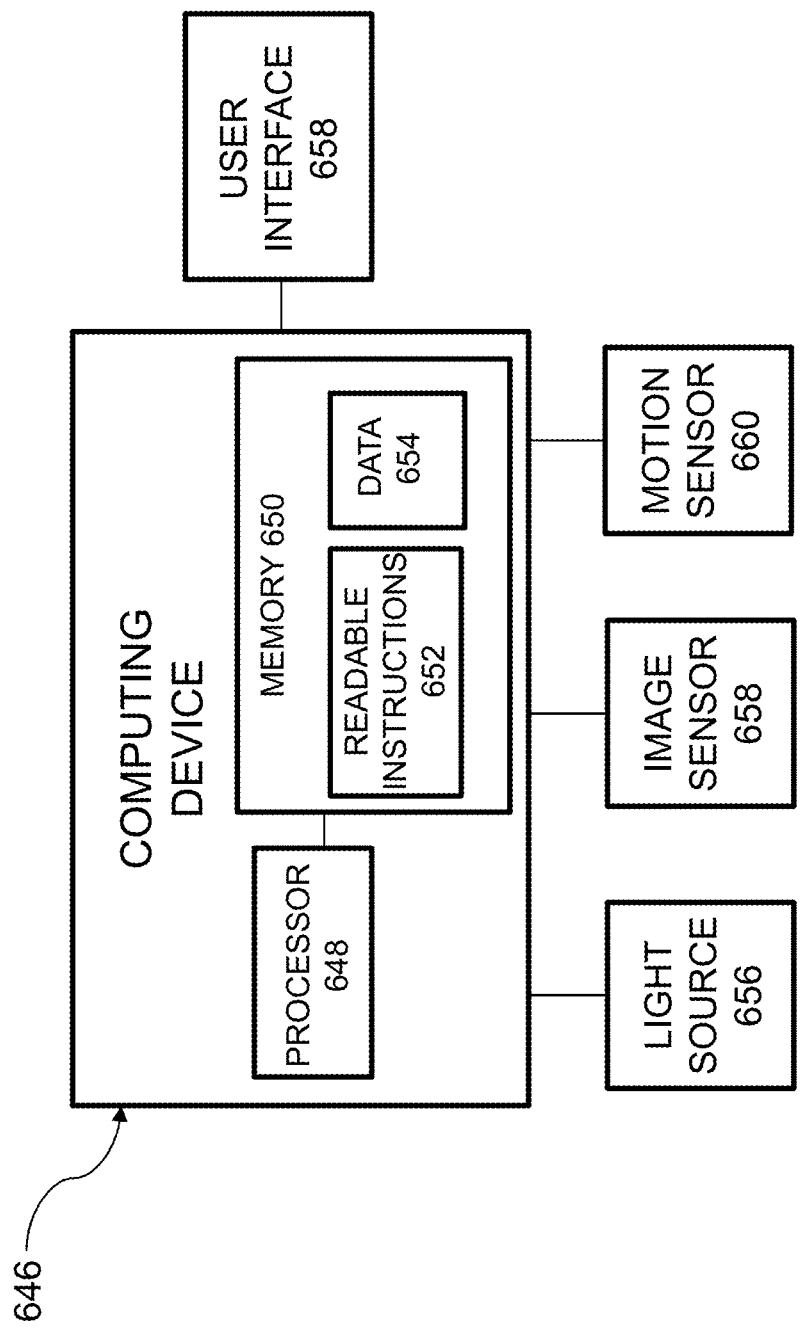
FIG. 6 illustrates a system that can be utilized in accordance with one or more embodiments of the present disclosure.

As discussed with respect to FIG. 6, de-blurring the image data for each row can also based on information from one or more motion sensors. The information can, for example, be velocity information and/or direction information from one or more motion sensors.

De-blurring can, alternatively or in additionally, be based on one or more other characteristics. For example, de-blurring the image data for each row can be based on determining a slope of skew of the bar code, other information provided with or in the image data, on an exposure time (e.g., the light blue area of the sequence of procedures illustrated in FIG. 4B) of each row of pixels, on the specific times during the pre-determined timing sequence that the light source was actuated, and/or a time difference between the initiation of the sequence of procedures to accumulate the charge in the first row of pixels and the initiation of the sequence of procedures to accumulate the charge in the second row of pixels.

In another example method of the present disclosure, the method for rolling shutter bar code imaging includes initiating the imaging of a bar code by initiating a sequence of procedures to capture light for a first row of pixels of the image of the bar code at a first time and initiating the sequence of procedures to capture light for a subsequent row of pixels of the image of the bar code at a second time. In this embodiment, the sequence of procedures includes:

a reset process that clears a charge from a row of pixels and marks a start of that row's exposure;

accumulating a charge in the rows of pixels as they are exposed to light thereby capturing image data to create an image; and actuating a light source to illuminate the bar code at multiple specific times during a pre-determined timing sequence.

Also included below is an example of a rolling shutter bar code imaging system embodiment where the embodiment includes a light source for illuminating a bar code, an image sensor for accumulating a charge in rows of pixels as they are exposed to light thereby capturing image data to create an image of the bar code. The system also includes a processor and memory having executable instructions to be executed by the processor to:

initiate a rolling shutter imaging process for the imaging of a bar code by initiating a sequence of procedures to capture light for a first row of pixels of the image of the bar code at a first time and initiating the sequence of procedures to capture light for a subsequent row of pixels of the image of the bar code at a second time. The system also includes instructions to generate multiple flashes of light by actuating the light source and capture the image data needed to create an image of the bar code as the rolling shutter imaging process is progressing.

In some embodiments, the flashes are in a predetermined pattern including at least one short flash and at least one long flash. Although any suitable pattern can be used, patterns having at least one short and one long flash have been found to be beneficial to the resulting image.

As discussed herein, the time difference between the first time and the subsequent time can be defined, for example, by the manufacturer, or other suitable party. In some embodiments, the multiple flashes of light include at least two types of flashes (e.g., short, medium, long, etc.) and wherein the memory further includes executable instructions to be executed by the processor to compare portions of the sequence of different rows occurring during a same type of flash event (i.e., both occurring during a long duration type of flash event). In some embodiments, the executable instructions can compare portions of the sequence of different rows occurring during two different types of flash events.

Figure 5:
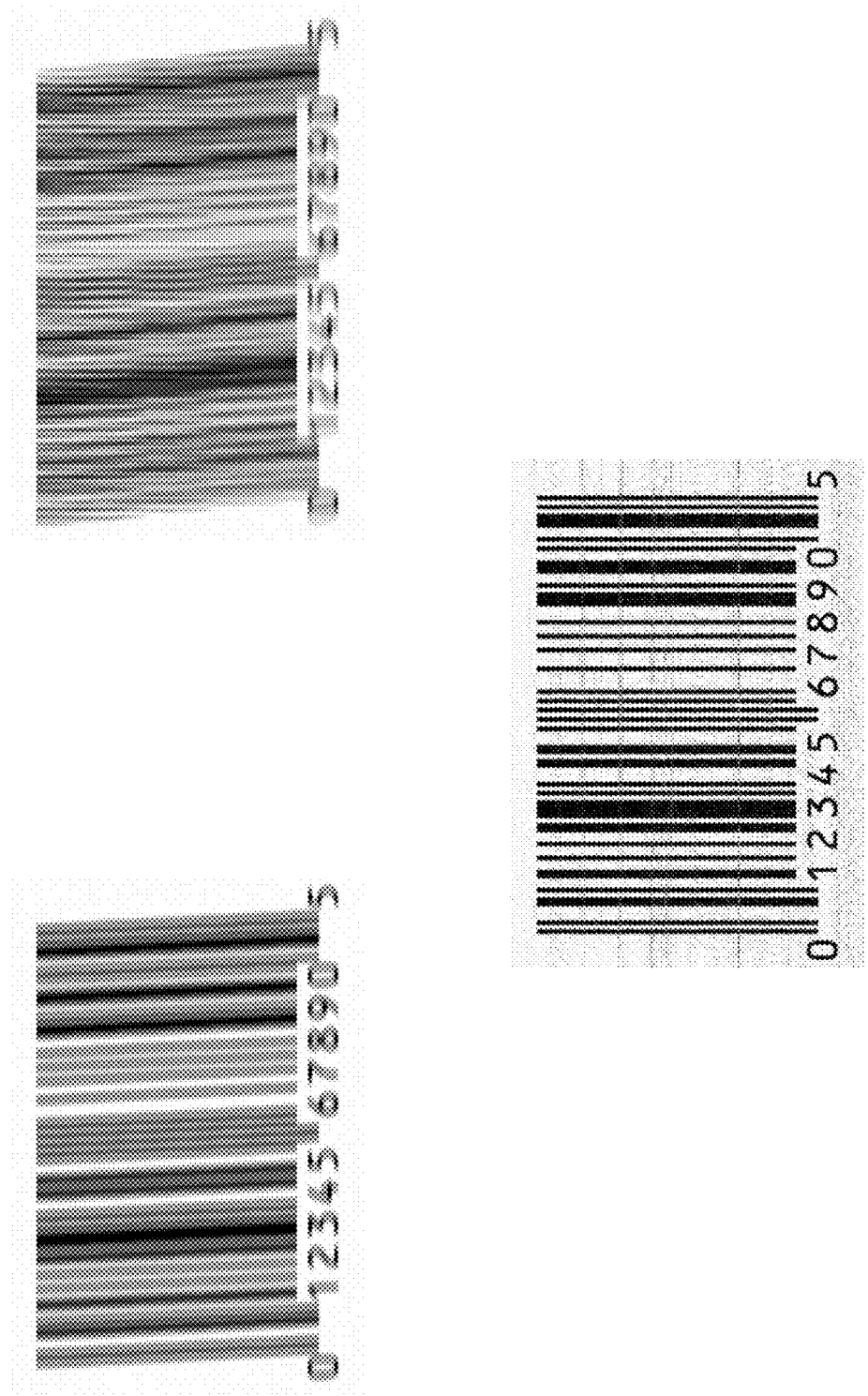
FIG. 5 illustrates an example of de-blurring in accordance with one or more embodiments of the present disclosure.

FIG. 5 illustrates an example of de-blurring in accordance with one or more embodiments of the present disclosure. In the top left image, a traditional capture process is used. As shown in FIG. 3, the bar code could not be accurately read with an image this blurry.

The image on the top right illustrates raw image data taken with a flutter flashing method (a method such as described with respect to FIG. 4B). In this image, the raw data is still blurry, but each row has a different blur.

Based on these differences, the image can be more effectively de-blurred. The bottom image is a de-blurred image of the raw data of the top right image.

As can be seen from this image, when each row is de-blurred differently, the end result is a much clearer de-blurred image in which each of the lines of the bar code are discrete, thereby allowing the bar code to be ready correctly.

The embodiments of the present disclosure improve the motion tolerance of rolling shutter scanners by capturing an image during which the illumination is "fluttered," leading to an image that, while still motion blurred, can be sharpened with well-posed de-blurring. For example, in some embodiments, (1) the use of a direct current (DC) light source (instead of a shutter or capacitive flash) to modulate exposure can be used, and (2) the fact that each row of the image will be differently blurred, due to the differing overlap between the rows' exposures and the illumination sequence can be utilized in the process of de-blurring.

The device embodiments of the present disclosure, used to accomplish the image capture and de-blurring of the image, have two parts: a modified controller which modulates the illumination (typically an LED) during the exposure of the image, and software which de-blurs the image after it is captured. Various software algorithms can be utilized for the de-blurring and de-skewing of the image. For example, a suitable de-blurring algorithm is proposed in: *Fast image deconvolution using hyper-laplacian priors*. Krishnan, D., Fergus, R,. In: NIPS (2009). De-skewing can be accomplished by shifting the results of each row over by one or more pixels to counteract the movement of the barcode. This can be accomplished, for example, by knowing the velocity of the barcode and time delay between each of sequences used to capture the row.

The illumination controller modulates light according to a pre-determined timing sequence, which is chosen to optimize the reconstruction performance after de-blurring. This pre-determined timing sequence can be selected by the manufacturer of the device, designer of the software, and/or user of the device.

Typically, this optimization enforces a maximum-minimum value on the Modulation Transfer Function (MTF) associated with the blur on each row. The software module which post-processes the image typically uses 1D deconvolution, but may also use more complicated de-blurring techniques which incorporate image priors.

In the following detailed description, reference is made to the accompanying figures that form a part hereof. The figures show by way of illustration how one or more embodiments of the disclosure may be practiced.

The embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

It should be noted that although many of the figures provided herein provided visual views of bar codes and images, the embodiments of the present disclosure can be accomplished by manipulating the data that is used to form the bar codes or images rather than the bar codes or images themselves. Further, as used herein, "a" or "a number of" something can refer to one or more such things. For example, "a number of imaging sensors" can refer to one or more imaging sensors.

FIG. 6 illustrates a system that can be utilized in accordance with one or more embodiments of the present disclosure. For instance, in various embodiments, the bar code reader or other device having computing functionality can perform some or all of the functions discussed herein.

For example, a computing device 646 (i.e., a device having computing functionality, as described herein, can also include a computer readable medium (CRM) 650 in communication with processing resources 948) can be used by a user via a user interface 658 to accomplish a multitude of functions by executing computing device readable instructions. CRM can be in communication with a device having processor resources. The device can be in communication with a tangible non-transitory CRM storing a set of computer-readable instructions (CRI) 652 executable by one or more of the processor resources, as described herein.

Data 654 can also be stored in CRM and can be used by CRI to accomplish computing tasks. In the embodiment of FIG. 6, CRI can be used to capture image data via an image sensor 658.

The device also includes a light source 656 that is used to illuminate the bar code. This light source can be controlled via logic or executable instructions executed by the processor 648. For example, the light source can be actuated to illuminate the bar code at multiple specific times (e.g., 2, 10, 25, etc.) during a pre-determined timing sequence (e.g., 20 milliseconds, 1 minute, etc.). These characteristics and others can be set by a user, in some embodiments. Example characteristics can include: number if light source illuminations (flashes), timing sequence duration, brightness of the illumination, and other characteristics.

This sensor data can then be stored in memory and used in the embodiments of the present disclosure. Additionally, data can include look-up tables, as mentioned above, and CRI can be used to access such tables and utilize the look-up tables for use in embodiments of the present disclosure.

The CRI can also be stored in remote memory managed by a server and represent an installation package that can be downloaded, installed, and executed. The device can include memory resources, and the processor resources can be coupled to the memory resources.

Processor resources 648 can execute CRI that can be stored on an internal or external non-transitory CRM. The processor resources can execute CRI to perform various functions. For example, the processor resources can execute CRI to perform a number of functions.

A non-transitory CRM, as used herein, can include volatile and/or non-volatile memory. Volatile memory can include memory that depends upon power to store information, such as various types of dynamic random access memory (DRAM), among others.

Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), etc., as well as other types of computer-readable media.

The non-transitory CRM can also include distributed storage media. For example, the CRM can be distributed among various locations. The non-transitory CRM can be integral, or communicatively coupled, to a computing device, in a wired and/or a wireless manner. For example, the non-transitory CRM can be an internal memory, a portable memory, a portable disk, or a memory associated with another computing resource (e.g., enabling CRI's to be transferred and/or executed across a network such as the Internet).

The CRM can be in communication with the processor resources via a communication path. The communication path can be local or remote to a machine (e.g., a computer) associated with the processor resources.

Examples of a local communication path can include an electronic bus internal to a machine (e.g., a computer) where the CRM is one of volatile, non-volatile, fixed, and/or removable storage medium in communication with the processor resources via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path can be such that the CRM is remote from the processor resources such as in a network relationship between the CRM and the processor resources. That is, the communication path can be a network relationship. Examples of such a network relationship can include a local area network (LAN), wide area network (WAN), personal area network (PAN), and the Internet, among others. In such examples, the CRM can be associated with a first computing device and the processor resources can be associated with a second computing device.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor, such as a microprocessor.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. In the foregoing Detailed Description, various features are grouped together in example embodiments illustrated in the figures for the purpose of streamlining the disclosure. Rather, inventive subject matter lies in less than all features of a single disclosed embodiment.

What is claimed:

1. A method for rolling shutter bar code imaging, comprising:
    initiating the imaging of a bar code by initiating a sequence of procedures to accumulate a charge in a first row of pixels as the first row of pixels are exposed to light thereby capturing data to create a first row of the image of the bar code at a first time;
    initiating the sequence of procedures to accumulate a charge in a subsequent row of pixels as the subsequent row of pixels are exposed to light thereby capturing data to create a subsequent row of the image of the bar code at a second time;
    actuating a light source to illuminate the bar code at multiple specific times during a pre-determined timing sequence; and
    de-blurring the image data for each row based on the specific times during the pre-determined timing sequence that the light source was actuated.

2. The method of claim 1, wherein the de-blurred image is sent to a decoder where information within the bar code is read.

3. The method of claim 1, wherein the method further includes de-skewing the de-blurred image.

4. The method of claim 1, wherein the method further includes de-skewing the image data.

5. The method of claim 1, wherein de-blurring the image data for each row is also based on information from one or more motion sensors.

6. The method of claim 1, wherein de-blurring the image data for each row is also based on velocity information from one or more motion sensors.

7. The method of claim 1, wherein de-blurring the image data for each row is also based on direction information from one or more motion sensors.

8. The method of claim 1, wherein de-blurring the image data for each row is also based on information from the image.

9. The method of claim 8, wherein de-blurring the image data for each row is also based on a time difference between the initiation of the sequence of procedures to accumulate the charge in the first row of pixels and the initiation of the sequence of procedures to accumulate the charge in the second row of pixels.

10. The method of claim 8, wherein de-blurring the image data for each row is also based on an exposure time of each row of pixels.

11. A method for rolling shutter bar code imaging, comprising:
initiating the imaging of a bar code by initiating a sequence of procedures to capture light for a first row of pixels of the image of the bar code at a first time;
initiating the sequence of procedures to capture light for a subsequent row of pixels of the image of the bar code at a second time, wherein the sequence of procedures includes:
a reset process that clears a charge from a row of pixels and mark a start of that row's exposure;
accumulating a charge in the rows of pixels as the rows of pixels are exposed to light thereby capturing image data to create an image; and
actuating a light source to illuminate the bar code at multiple specific times during a pre-determined timing sequence.

12. The method of claim 11, wherein the method further includes de-blurring the image data for each row based on determining a slope of skew of the bar code.

13. The method of claim 12, wherein de-blurring the image data for each row is also based on a time difference between the initiation of the sequence of procedures to accumulate the charge in the first row of pixels and the initiation of the sequence of procedures to accumulate the charge in the second row of pixels.

14. The method of claim 13, wherein de-blurring the image data for each row is also based on an exposure time of each row of pixels.

15. The method of claim 11, wherein the method further includes de-blurring the image data for each row based on the specific times during the predetermined timing sequence that the light source was actuated.

16. A rolling shutter bar code imaging system, comprising:
a light source for illuminating a bar code;
an image sensor for accumulating a charge in rows of pixels as the rows of pixels are exposed to light thereby capturing image data to create an image of the bar code;
a processor;
memory having executable instructions to be executed by the processor to:
initiate a rolling shutter imaging process for the imaging of a bar code by initiating a sequence of procedures to capture light for a first row of pixels of the image of the bar code at a first time;
initiating the sequence of procedures to capture light for a subsequent row of pixels of the image of the bar code at a second time;
actuating the light source to illuminate the bar code at multiple specific times during a pre-determined timing sequence; and
de-blurring the image data for each row of pixels based on the specific times during the pre-determined timing sequence that the light source was actuated.

17. The system of claim 16, wherein the flashes are in a predetermined pattern including at least one short flash and at least one long flash.

18. The system of claim 16, wherein the system includes a user interface and wherein the time difference between the first time and the subsequent time is defined by a user.

19. The system of claim 16, wherein the multiple flashes of light include at least two types of flashes and wherein the memory further includes executable instructions to be executed by the processor to compare portions of the sequence of different rows occurring during a same type of flash event.

20. The system of claim 19, wherein the memory further includes executable instructions to be executed by the processor to compare portions of the sequence of different rows occurring during two different types of flash events.

* * * * *